United States Patent

Segall

[15] 3,677,024

[45] July 18, 1972

[54] PRESERVATION AND STORAGE OF BIOLOGIC MATERIALS

[72] Inventor: Paul E. Segall, 15 Cambridge Road, East Rockaway, N.Y. 11518

[22] Filed: Jan. 20, 1970

[21] Appl. No.: 4,430

[52] U.S. Cl. ..................................62/64, 99/189, 128/1, 195/1.8
[51] Int. Cl. .......................................F25d 17/02
[58] Field of Search...............62/62, 4, 66, 56, 75; 128/1; 195/1.7, 1.8; 99/197, 8, 189, 192

[56] References Cited

UNITED STATES PATENTS

| | | | |
|---|---|---|---|
| 2,875,588 | 3/1959 | Berger | 62/64 X |
| 2,662,520 | 12/1953 | McMahon | 128/1 |
| 3,092,974 | 6/1963 | Haumann et al | 62/62 |

*Primary Examiner*—Meyer Perlin
*Assistant Examiner*—Ronald C. Capossela
*Attorney*—Marn and Jangarathis

[57] ABSTRACT

Method for preserving and storing biologic material including viable beings, living tissue and organs, foodstuffs and the like. The biologic material is subjected to ultrahyperbaric pressure of about $2.0 \times 10^3$ atmospheres in the presence of inert gas. The temperature is reduced to about $-20°$ C., whereupon the material is subjected to a further pressure increase to below about $3.4 \times 10^3$ atmospheres to effect a phase change of water from the liquid phase to the solid phase. The temperature and pressure of the material is then reduced to about atmospheric pressure at the temperature necessary to maintain the formed solid phase of water. Under such conditions the materials may be stored for extended periods of time without significant deterioration. The process of preservation is reversed to restore the material to ambient conditions.

15 Claims, No Drawings

PRESERVATION AND STORAGE OF BIOLOGIC MATERIALS

This invention relates to the preservation of biologic material, and more particularly to the preservation and storage of biologic materials for extended periods of time without significant deleterious effects.

Biologic materials are composed to a considerable extend of cellular components containing aqueous fluid. Such materials are difficult to preserve and store for any substantial length of time, as is apparent from the spoilage of food; deterioration of shelf life of medicines and biochemicals; and the aging of the human body. The deterioration and other detrimental reactions which occur quite rapidly in these materials at ordinary room temperatures can be greatly slowed as the materials are subjected to lower and lower temperature, and theoretically arrested at absolute zero. Even with biochemical materials stored at 0° C., it is necessary to use such materials as soon as possible before deterioration becomes significant. It has been suggested to preserve and store such materials at below normal freezing temperatures under hydrostatically induced high pressures.

For several decades meat, fish, vegetables and fruit have been available at frozen food counters, but have met with varying degrees of public satisfaction. Early attempts resulted in considerable damage to the product during freezing with a concomitant reduction in flavor, which is overcome, even today, by the addition of artificial flavoring. While advances have been made in the coffee industry, i.e., freeze dried coffee, the freezing of nutritional foods still suffer from damage by freezing with loss of flavor and consistency necessitating the addition of chemical preservatives and flavoring.

Water and aqueous solutions upon being subjected to lowering temperatures expand upon freezing. Consequentially, materials formed of or containing cells when subjected to lowering temperatures, at atmospheric pressure, are destroyed by rupturing of the cells which is the reason that known freezing process for the preservation and storage of biological materials leave room for improvement.

It is an object of my invention to provide an improved method for preserving a biologic material in substantially a solid phase system.

Another object of my invention is to provide a method for preserving and storing a biologic material in a solid phase system at atmospheric pressure for extended periods of time.

Still another object of my invention is to revive a biologic material stored in a solid phase system at atmospheric pressure to substantially the condition the biologic material existed prior to preservation and storage without significant deterioration.

A further object of my invention is to provide a process for preserving and storage of biologic material which requires no chemical preservatives.

Still another object of my invention is to provide a process for the preservation and storage of foodstuffs which may be restored to a condition not requiring artificial flavoring.

These and other objects of the invention shall become readily apparent from the following description.

The biologic materials which may be treated in accordance with this invention include various living biological materials, such as tissues, whole organisms, and organs. Organs include livers, hearts, lungs and other tissues suitable for transplanting. Additionally, foodstuffs, such as fruits, vegetables, meats, fishes and the like may be treated in accordance with the invention. Additionally, non-living biological materials, such as vaccines, sera, enzymes and hormones may be processed. Thus, it will no longer be necessary to rely entirely upon seasonal supply of fresh fruits and vegetables; year-round supply of such fruits and vegetables can be made available. Seafoods, such as whole lobsters and crabs, may be preserved and stored when caught with flavor intact, since substantially no cellular damage is effected by the method of this invention. The biologic material treated may be stored indefinitely without significant histological, biochemical or physiological deterioration.

In accordance with one embodiment of the invention, the biologic material to be processed is placed in a chamber constructed to withstand ultrahyperbaric pressures, i.e., pressures exceeding about $2.0 \times 10^3$ atmospheres and cryogenic temperatures, i.e., about $-200°$ C., and which is provided with suitable pressure and temperature control means. Temperature control within the chamber may be effected by placing the chamber within a vessel through which a heat transfer medium is passed, or by providing indirect heat transfer coils about the chamber walls, within the chamber walls, or inside the chamber, or any combination of such means. pressurization of the chamber is achieved by the use of a multi-stage gas compressor or by liquid under pressure.

The chamber is purged with an inert gas and then pressurized with such inert gas at a rate to allow all components of the material to reach equilibrium. Any inert gas or liquid (fluid) may be utilized which does not react with and thus alter the material being processed. Helium is particularly useful being monoatomic with a small diameter and mass, and is readily permeable to the various membranes comprising the cells, tissue, etc., of the biologic material. It is contemplated that other noble gases may be used, such as neon and argon. It is understood that by using gases heavier than helium, that time factors will be different since such heavier gases will permeate such membranes at lower rates thereby more slowly reaching an equilibrium condition.

The pressure within the chamber is then raised to about $2.0 \times 10^3$ atmospheres by the compressor as the temperature is lowered to about $-20°$ C. The pressure may be first raised with the temperature being subsequently lowered, or both temperature and pressure may be lowered and raised, respectively, provided that there is no formation of a solid phase of any aqueous systems.

Upon reaching these conditions the pressure is preferably thereafter slowly raised to a pressure less than about $3.4 \times 10^3$ atmospheres whereby the aqueous systems of the biologic material undergoes a rapid, gradient free transition into a solid state system. Under these conditions, slight contraction occurs of the solid phase of any aqueous system, with substantially no damage to the cellular components of the biologic material. Alternately, the temperature may be lowered at $2.0 \times 10^3$ atmospheres to cause the aqueous systems to undergo the phase change to the solid state system. Effecting the phase change by lowering temperature would involve temperature gradients, which for the preservation of foodstuffs and non-living biologic materials would be acceptable. For living biological materials, however, it is preferred to effect the phase change by increasing the pressure since a gradient free change is effected substantially instantaneously throughout the entire material.

In accordance with another embodiment of the invention, the temperature within the chamber is further reduced with the pressure thereafter being reduced to atmospheric. The temperature to which the material is lowered is that temperature at which no phase change of the solid state system would occur when the pressure is lowered to atmospheric pressure. Liquid nitrogen (i.e., $-196°$ C.) being readily available, is a particularly suitable refrigerant to lower the temperature of the biologic material. Additionally, after reduction of pressure to atmospheric, the material may be exposed to liquid nitrogen without deleterious effects since liquid nitrogen (at atmospheric pressure) is substantially inert. The now frozen biologic material may then be transferred to another vessel at atmospheric pressure and maintained at low temperatures by liquid nitrogen ($-196°$ C.) wherein the material may be stored for almost indefinite periods of time at relatively low costs.

When desired, the biologic material may be returned to ambient conditions by reversing the procedure. Accordingly, the frozen biologic material is placed in the ultrahyperbaric chamber, which after closure, is purged with the inert gas used to effect preservation, such as helium. The chamber is then pressurized with the inert gas to a pressure of about $3.0 \times 10^3$ atmospheres and the temperature raised to about $-20°$ C., while maintaining the solid phase system. Upon reaching these conditions, the pressure is slowly reduced to about $2.0 \times 10^3$ atmospheres whereby a gradient free and substantially instantaneous change is effected from a solid phase system to a liquid phase system. Thereafter the pressure is further reduced to atmospheric pressure with a concomitant increase in temperature controlled to prevent any change of any aqueous system to a solid phase.

When preserving living whole organisms or organs it is desirable to initially reduce the temperature of such whole organisms or organs to a temperature of minimal activity. Such a temperature is about 4° C., which is also the temperature of maximum density of water in the aqueous systems. Such initial temperature will vary for the diverse organs or whole organisms being treated.

The method of this invention has four major advantages over processes for the freezing of biologic materials at atmospheric pressures. First, there is substantially no destructive expansion during the liquid state-solid state transition (crystallization). Secondly, since the preferred method depends upon pressure for crystallization, it is thermally gradient free, so that large masses may be frozen homogeneously. Thirdly, crystallization, being very rapid and homogeneous, allows suspended and dissolved particles to be frozen in their natural state, rather than in s "salted out" condition. Fourthly, helium, under 30,000 psi, acts as an efficient heat conductor, and thus would allow for rapid and even thermal changes.

Numerous modifications and variations of the present invention are possible in light of the above teachings and, therefore, it is to be understood that the invention may be practiced otherwise than as particularly described.

I claim:

1. A method for preserving biologic material having aqueous systems which comprises:
   a. placing said biologic material into a hyperbaric chamber;
   b. introducing an inert fluid into said chamber in direct contact with said biologic material and pressurizing said chamber with said fluid to a pressure of about $2.0 \times 10^3$ atmospheres; and
   c. further reducing the temperature in said chamber and further increasing the pressure in said chamber to change the fluid phase of said aqueous systems to a solid phase.

2. The method defined in claim 1 wherein the temperature reduction of step (c) is to a temperature of $-20°$ C. and thereafter maintained constant as the pressure is increased.

3. The method defined in claim 2 wherein the pressure is increased to a pressure below about $3.4 \times 10^3$ atmospheres.

4. The method defined in claim 1 wherein the chamber is purged with an inert gas prior to pressurizing said chamber with said inert gas.

5. The method as defined in claim 1 wherein the temperature of the biologic material to be treated is reduced to a temperature of minimal activity, about 4° C., at atmospheric pressure prior to introduction into said chamber.

6. The method as defined in claim 1 wherein helium is the inert fluid.

7. A method for preserving and storing biologic material having aqueous systems which comprises:
   a. placing said biologic material into a hyperbaric chamber;
   b. introducing an inert fluid into said chamber in direct contact with said biologic material and pressurizing said chamber to a pressure of about $2.0 \times 10^3$ atmospheres;
   c. reducing the temperatures in said chamber;
   d. increasing the pressure in said chamber to change the fluid phase of said aqueous systems to a solid phase;
   e. further reducing the temperature and pressure in said chamber while maintaining the solid phase of said aqueous systems, said pressure being reduced to about atmospheric; and
   f. storing said material at about atmospheric pressure at the temperature necessary to maintain said solid phase.

8. The method defined in claim 7 wherein the temperature of the biologic material is reduced to a temperature of minimal activity, about 4° C., prior to introduction into said chamber.

9. The method as defined in claim 7 wherein the temperature reduction of step (c) is to a temperature of $-20°$ C. and maintained constant prior to said pressure increase.

10. The method as defined in claim 9 wherein the pressure is increased to a pressure less than about $3.4 \times 10^3$ atmospheres.

11. The method as defined in claim 7 wherein helium is the inert fluid.

12. The method as defined in claim 7 wherein the temperature reduction of step (e) is to a temperature of $-196°$ C.

13. The method defined in claim 11 wherein the temperature reduction of step (e) is effected prior to pressure reduction.

14. The method as defined in claim 7 wherein the material is stored at a temperature at which nitrogen is a liquid.

15. A method for restoring the viability of a biologic material stored in accordance with claim 7 which comprises
   a. subjecting said material to a pressure of between about 2.2 to $3.4 \times 10^3$ atmospheres;
   b. thereupon raising the temperature of said material to a temperature of at least about $-20°$ C.;
   c. reducing the pressure on said material to about $2.0 \times 10^3$ atmospheres whereupon the solid phase changes to a liquid phase; and
   d. returning the material to ambient conditions while avoiding formation of another solid phase of said aqueous systems.

* * * * *